US012776053B2

(12) United States Patent
Park et al.

(10) Patent No.: US 12,776,053 B2
(45) Date of Patent: Oct. 27, 2026

(54) APPARATUS FOR DETERMINING VIDEO BASED ON DEPTH INFORMATION AND METHOD THEREOF

(71) Applicant: BeyondTech Inc., Seoul (KR)

(72) Inventors: Gunyoung Park, Incheon (KR); Jae Cheng Lee, Seoul (KR); Injae Yoo, Seoul (KR)

(73) Assignee: BeyondTech Inc., Seoul (KR)

( * ) Notice: Subject to any disclaimer, the term of this patent is extended or adjusted under 35 U.S.C. 154(b) by 336 days.

(21) Appl. No.: 18/289,221

(22) PCT Filed: Dec. 21, 2022

(86) PCT No.: PCT/KR2022/020917
§ 371 (c)(1),
(2) Date: Nov. 1, 2023

(87) PCT Pub. No.: WO2024/135878
PCT Pub. Date: Jun. 27, 2024

(65) Prior Publication Data

US 2025/0104260 A1 Mar. 27, 2025

(30) Foreign Application Priority Data

Dec. 19, 2022 (KR) ........................ 10-2022-0178113

(51) Int. Cl.
*H04N 13/00* (2018.01)
*G06F 16/71* (2019.01)
(Continued)

(52) U.S. Cl.
CPC ................ *G06T 7/55* (2017.01); *G06F 16/71* (2019.01); *G06V 10/44* (2022.01); *G06V 10/761* (2022.01);
(Continued)

(58) Field of Classification Search
CPC .. G06T 7/55; G06T 7/50; G06T 7/593; G06T 7/596; G06T 7/70; G06T 7/73;
(Continued)

(56) References Cited

U.S. PATENT DOCUMENTS

| | | | | |
|---|---|---|---|---|
| 11,368,289 B1 * | 6/2022 | Kvochko | | G06V 20/46 |
| 2014/0241434 A1 * | 8/2014 | Lin | | H04N 19/597<br>375/240.16 |

(Continued)

FOREIGN PATENT DOCUMENTS

| | | | | |
|---|---|---|---|---|
| GB | 2493514 A * | 2/2013 | | G06F 16/683 |
| KR | 10-2005-001802 A | 1/2005 | | |

(Continued)

OTHER PUBLICATIONS

Li, Ming et al. "MODE: Multi-view Omnidirectional Depth Estimation with 360° Cameras", Nov. 2, 2022, ECCV 2022, pp. 197-213. <DOI: https://doi.org/10.1007/978-3-031-19827-4_12>. (Year: 2022).*

*Primary Examiner* — Matthew C Bella
*Assistant Examiner* — Nicholas John Helco
(74) *Attorney, Agent, or Firm* — Revolution IP, PLLC

(57) ABSTRACT

An apparatus for determining a video based on depth information, includes an original video extraction unit that receives an original multi-view video, extracts a plurality of frames from the input original multi-view video, extracts a plurality of basic screen feature information from the extracted basic screen for each frame, and stores the extracted plurality of basic screen feature information; a query video extraction unit that receives a query multi-view video, extracts a plurality of frames and depth information screens from the input query multi-view video, extracts a plurality of depth information screen feature information from the extracted depth information screen for each frame, and stores the plurality of depth information screen feature
(Continued)

information in a query database for each frame; and a video determination unit that compares basic screen feature information of the original multi-view video with the depth information screen feature information of the query multi-view video.

10 Claims, 4 Drawing Sheets

(51) Int. Cl.

| | |
|---|---|
| ***G06T 7/55*** | (2017.01) |
| ***G06V 10/44*** | (2022.01) |
| ***G06V 10/74*** | (2022.01) |
| ***H04N 13/351*** | (2018.01) |

(52) U.S. Cl.

CPC ... *H04N 13/351* (2018.05); *H04N 2013/0081* (2013.01)

(58) Field of Classification Search

CPC ... G06T 7/74; G06T 7/97; G06T 2207/10021; G06T 2207/10028; G06F 16/71; G06F 16/783; G06F 16/53; G06F 16/7328; G06F 18/22; G06F 16/70; G06V 10/44; G06V 10/761; G06V 10/74; G06V 20/46; G06V 10/75; G06V 10/757; G06V 10/16; G06V 20/40; G06V 20/48; G06V 20/20; H04N 13/351; H04N 2013/0081; H04N 13/271; H04N 13/282; H04N 13/349; H04N 2013/0074; H04N 13/10

See application file for complete search history.

(56) References Cited

U.S. PATENT DOCUMENTS

| | | | | |
|---|---|---|---|---|
| 2018/0211373 | A1* | 7/2018 | Stoppa | G06T 7/55 |
| 2020/0125600 | A1* | 4/2020 | Jo | G06F 16/784 |
| 2022/0156955 | A1* | 5/2022 | Doyen | H04N 13/122 |
| 2022/0207874 | A1* | 6/2022 | Stenger | G06V 10/469 |
| 2022/0394229 | A1* | 12/2022 | Kroon | H04N 13/128 |
| 2023/0215129 | A1* | 7/2023 | Ninan | G06T 7/55 382/190 |

FOREIGN PATENT DOCUMENTS

| | | | |
|---|---|---|---|
| KR | 10-2010-0109345 | A | 10/2010 |
| KR | 10-2013-0044099 | A | 5/2013 |
| KR | 10-2013-0073097 | A | 7/2013 |
| KR | 10-2014-0049161 | A | 4/2014 |
| KR | 10-2019-0035146 | A | 4/2019 |
| KR | 10-2052535 | B1 | 1/2020 |

* cited by examiner

APPARATUS FOR DETERMINING VIDEO BASED ON DEPTH INFORMATION AND METHOD THEREOF

TECHNICAL FIELD

The present invention relates to an apparatus for determining a video based on depth information and method thereof, and more specifically, an apparatus for determining a video based on depth information and method thereof that compare feature information extracted from an original multi-view video and a query multi-view video to determine whether they are the same video or not.

BACKGROUND

Metaverse is a 3D virtual world that is a compound word of meta, which means artificial or abstract, and universe, which means the real world. The metaverse allows a user to be more immersed in content by using augmented reality (AR) and virtual reality (VR) technologies.

On the other hand, the content provided to the metaverse is mainly a video taken through a multi-view camera, and a video that is disseminated after applying a slight transformation, for example, an illegally copied video in which a part of the screen is cut off or the resolution is lowered may be used.

In addition, since the fully revised Copyright Act includes a provision of 'mandatory technical measures (filtering) to block the transmission of illegally copied videos' by an online service provider (OSP) of special types such as P2P and webhard, a study is being conducted to identify whether a video provided to the user in the metaverse is the same copyrighted work as another person's copyrighted work.

However, in the case of multi-view videos, since they are transmitted in a file format in which a basic video (basic view) and a depth information screen (additional view) are combined, and thereby the file capacity of the original video and query video is larger than that of a general stereo type video, so there is a problem that the speed of sending and receiving files is slow to identify the videos.

In addition, since the illegal works filtering technology is mainly used to determine whether a 2D video is illegally copied, there is a limit in that it cannot be applied to 3D video such as a 360-degree virtual reality (VR) video.

The background technology of the present invention is disclosed in Korean Unexamined Patent Publication No. 10-2005-001802 (published on Feb. 23, 2005).

SUMMARY OF INVENTION

Technical Problem

As described above, according to the present invention, an object of the present invention is to provide an apparatus for determining a video based on depth information and method thereof that compare feature information extracted from an original multi-view video and a query multi-view video to determine whether they are the same video or not.

Technical Solutions

According to an embodiment of the present invention for achieving such a technical problem, there is provided an apparatus for determining a video based on depth information, the apparatus including an original video extraction unit that receives an original multi-view video, extracts a plurality of frames from the input original multi-view video, extracts a plurality of basic screen feature information from the extracted basic screen for each frame, and stores the extracted plurality of basic screen feature information in an original database for each frame; a query video extraction unit that receives a query multi-view video, extracts a plurality of frames and depth information screens from the input query multi-view video, extracts a plurality of depth information screen feature information from the extracted depth information screen for each frame, and stores the plurality of depth information screen feature information in a query database for each frame; and a video determination unit that compares basic screen feature information of the original multi-view video with the depth information screen feature information of the query multi-view video to determine whether the query multi-view video is the same as the original multi-view video.

The query multi-view video extraction unit may calculate each of differences between the basic screens in a plurality of multi-view videos captured by a plurality of cameras installed at different locations, sum up the calculated difference values, and then compresses the sums to generate the depth information screen.

The depth information screen may have a smaller size and capacity than those of the basic information screen.

The original video extraction unit may include a video frame extraction module that extracts a plurality of frames from the input original multi-view video; a basic screen feature information extraction module that extracts the basic screen from the original multi-view video and extracts basic screen feature information of a preset type for each frame from the extracted basic screen; and an original database generation module that stores the extracted plurality of basic screen feature information for each frame in the original database.

The query video extraction unit may include a video frame extraction module that receives the query multi-view video and extracts a plurality of frames from the input query multi-view video; a depth information screen extraction module that extracts a plurality of depth information screens in which depth information is stored from the input query multi-view video; and a query database generation module that extracts a plurality of depth information screen feature information from the extracted depth information screen for each frame and stores the plurality of depth information screen feature information for each frame in the query database.

The video determination unit may include a feature information input module that receives input of the generated original database and query database; a similarity determination module that compares and determines a similarity by applying the input original database and query database to a pre-learned similarity model; and a providing module that provides, through a blockchain network, whether the query multi-view video is the same as the original multi-view video as a result of the similarity determination.

According to another embodiment of the present invention, there is provided a method for determining a video based on depth information executed by an apparatus for determining a video, the method including a step of receiving an original multi-view video and extracting a plurality of frames from the input original multi-view video; a step of extracting a plurality of basic screen feature information from each of the extracted frames; a step of storing the extracted plurality of basic screen feature information in an original database for each frame; a step of receiving a query multi-view video and extracting a plurality of frames and depth information screens from the input query multi-view video; a step of extracting a plurality of depth information screen feature information from the extracted depth information screen for each frame; a step of storing the extracted plurality of depth information screen feature information in a query database for each frame; and a step of comparing basic screen feature information of the extracted original multi-view video with the depth information screen feature information of the query multi-view video to determine whether the query multi-view video is the same as the original multi-view video.

Advantageous Effects

As described above, according to the present invention, by using the basic screen feature information of the original multi-view video and the depth information screen feature information of the query multi-view video, it is possible to determine whether the videos are the same as each other, so that it is possible to perform the determination more quickly than before, and reduce a communication load in that the depth information screen feature information having a small data capacity may be used.

BEST MODE FOR INVENTION

Figure 1:
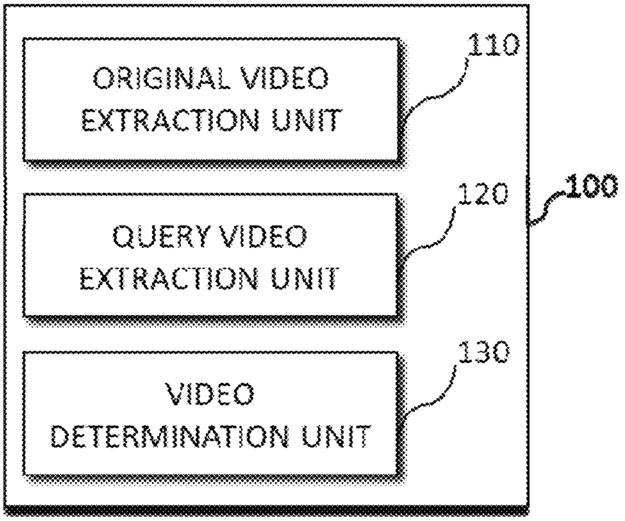
FIG. 1 is a block diagram of an apparatus for determining a video based on depth information according to an embodiment of the present invention.

Hereinafter, with reference to the accompanying drawings, embodiments of the present invention will be described in detail so that those skilled in the art may easily practice the present invention. However, the present invention may be implemented in many different forms and is not limited to the embodiments described herein. In addition, in order to clearly explain the present invention in the drawings, parts irrelevant to the description are omitted, and similar reference numerals are attached to similar parts throughout the specification.

Throughout the specification, when a certain component is said to "include", this means that it may further include other components without excluding other components unless otherwise stated.

With reference to the accompanying drawings, embodiments of the present invention will be described in detail so that those skilled in the art may easily practice the present invention.

First, an apparatus for determining a video based on depth information according to an embodiment of the present invention will be described with reference to FIGS. 1 to 4.

FIG. 1 is a block diagram of the apparatus for determining a video based on depth information according to an embodiment of the present invention.

As shown in FIG. 1, an apparatus 100 for determining a video based on depth information includes an original video extraction unit 110, a query video extraction unit 120, and a video determination unit 130.

First, the original video extraction unit 110 receives an original multi-view video, extracts a plurality of frames from the input original multi-view video, extracts a plurality of basic screen feature information from the extracted basic screen for each frame, and stores the extracted plurality of basic screen feature information in an original database for each frame.

Further, the query video extraction unit 120 receives the query multi-view video, extracts a plurality of frames and depth information screens from the input query multi-view video, extracts a plurality of depth information screen feature information from the extracted depth information screen for each frame, and stores the extracted plurality of depth information screen feature information in a query database for each frame.

To elaborate, the query video extraction unit 120 may calculate each of differences between the basic screens in a plurality of query multi-view videos captured by a plurality of cameras installed at different locations, sum up the calculated difference values, and then compress the sums to generate the depth information screen.

Here, the depth information screen may have a smaller size and capacity than those of the basic screen.

In this case, the apparatus 100 for determining a video based on depth information may receive the original multi-view video or the query multi-view video using MPEG immersive video (MIV) technology.

Here, the MIV is a technology that encrypts and decodes a screen that additionally combines the basic screen (basic view) of the multi-view video and the depth information screen (additional view) obtained by summing the difference between unique feature information of each view and the basic view and then compressing the video. The multi-view video is a plurality of cameras with different positions (for example, a total of 16 cameras with different positions in the upper, middle, and lower directions), and the basic screen may be a reference frame including feature information of a video among videos captured by the plurality of cameras.

That is, the original video extraction unit 110 may match or combine the depth information screen with the basic screen, similarly to the query video extraction unit 120.

Next, the video determination unit 130 compares basic screen feature information of the original multi-view video with the depth information screen feature information of the query multi-view video to determine whether the query multi-view video is the same as the original multi-view video.

Figure 2:
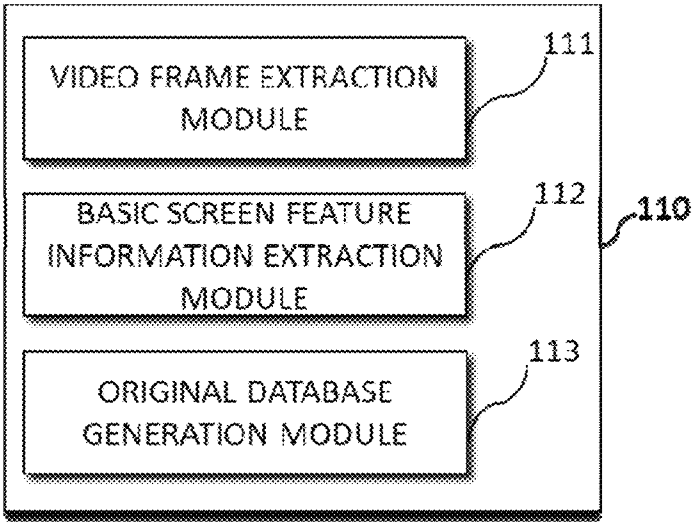
FIG. 2 is a block diagram showing an original video extraction unit shown in FIG. 1.

FIG. 2 is a block diagram showing the original video extraction unit shown in FIG. 1.

Referring to FIG. 2, the original video extraction unit 110 includes a video frame extraction module 111, a basic screen feature information extraction module 112, and an original database generation module 113.

First, the video frame extraction module 111 extracts a plurality of frames from the input original multi-view video.

In addition, the basic screen feature information extraction module 112 extracts the basic screen from the original multi-view video, and extracts basic screen feature information of a preset type for each frame from the extracted basic screen.

At this time, the basic screen feature information extraction module 112 may extract a plurality of basic screen feature information of a preset type (for example, object type, object position, object outline, object shape and size, and motion).

Finally, the original database generation module 113 stores the extracted plurality of basic screen feature information for each frame in the original database.

Figure 3:
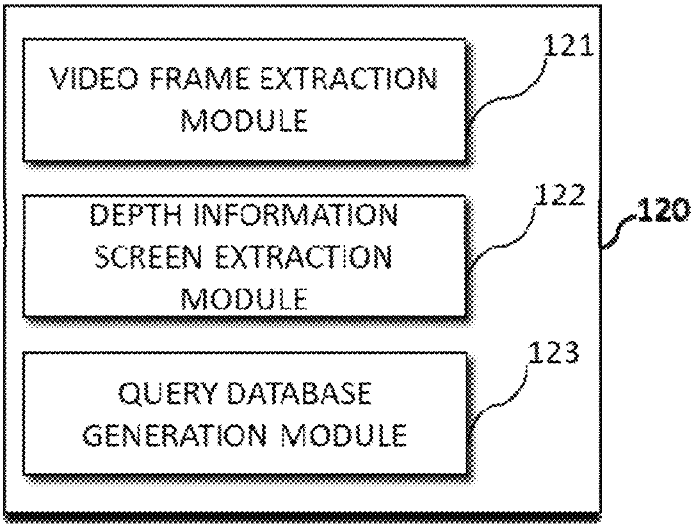
FIG. 3 is a block diagram showing a query video extraction unit shown in FIG. 1.

FIG. 3 is a block diagram showing the query video extraction unit shown in FIG. 1.

Referring to FIG. 3, the query video extraction unit 120 includes a video frame extraction module 121, a depth information screen extraction module 122, and a query database generation module 123.

First, the video frame extraction module 121 receives the query multi-view video and extracts a plurality of frames from the input query multi-view video.

Further, the depth information screen extraction module 122 extracts a plurality of depth information screens in which depth information is stored from the input query multi-view video.

At this time, the depth information screen extraction module 122 calculates each of differences between basic screens in the plurality of query multi-view videos captured from a plurality of cameras (for example, 16 cameras configured in a 4×4 shape) at different positions, respectively, and it is possible to extract the depth information screen in the form of combining the depth information screen generated by summing and compressing the calculated difference values with the basic screen.

Also, the depth information screen extraction module 122 may extract the depth information screen from the query multi-view video of a form in which the depth information screen is combined with the basic screen.

Finally, the query database generation module 123 extracts a plurality of depth information screen feature information from the extracted depth information screen for each frame and stores the plurality of depth information screen feature information for each frame in the query database.

Here, the query database generation module 123 may extract a plurality of depth information screen feature information of a preset type (for example, object type, object position, object outline, object shape, size, and motion), and store it in the database.

Figure 4:
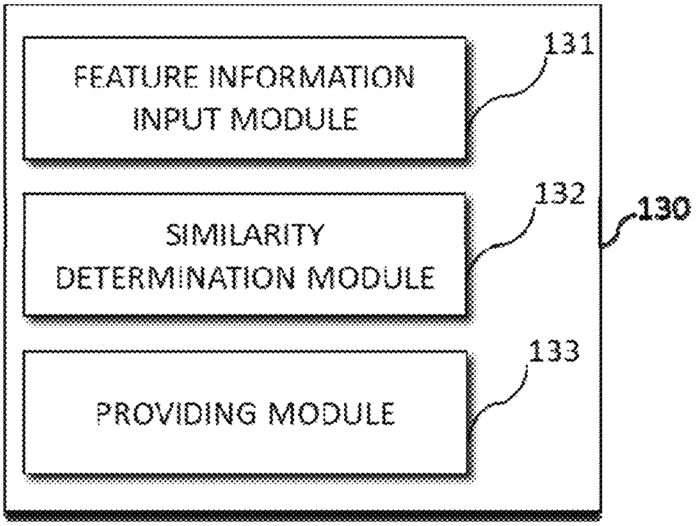
FIG. 4 is a block diagram showing a video determination unit shown in FIG. 1.

FIG. 4 is a block diagram showing the video determination unit shown in FIG. 1.

Referring to FIG. 4, the video determination unit 130 includes a feature information input module 131, a similarity determination module 132, and a providing module 133.

First, the feature information input module 131 receives input of the original database stored in the original video extraction unit 110 and the query database stored in the query video extraction unit 120.

In other words, the feature information input module 131 may receive the plurality of basic screen feature information stored for each frame in the original multi-view video and the plurality of depth information screen feature information stored for each frame in the query multi-view video.

Then, the similarity determination module 132 compares and determines the similarity by applying the input original database and query database to the pre-learned similarity model.

Specifically, the similarity determination module 132 compares the similarity by applying the original database and the query database to a pre-learned similarity model, and when the similarity falls within a preset ratio range (for example, 85% to 100%), may determine that the query multi-view video is the same as the original multi-view video.

In addition, the providing module 133 provides, through a blockchain network, whether the query multi-view video is the same as the original multi-view video as a result of the similarity determination.

At this time, the blockchain network includes a public blockchain network, a private blockchain network, and a hybrid blockchain network, and the determination result may be provided efficiently and securely.

Hereinafter, a method for determining a video based on depth information according to an embodiment of the present invention will be described in detail with reference to FIGS. 5 to 8.

Figure 5:
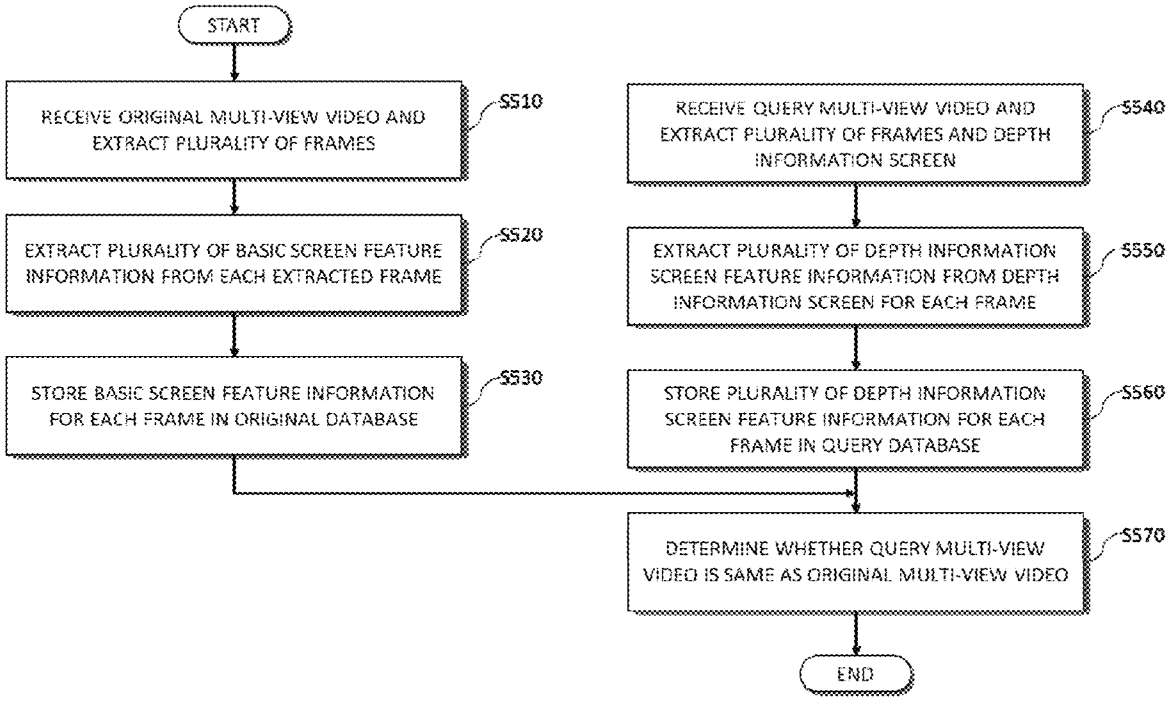
FIG. 5 is a flowchart of a method for determining a video using an apparatus for determining a video based on depth information according to an embodiment of the present invention.

FIG. 5 is a flowchart of the method for determining a video based on depth information according to an embodiment of the present invention.

As shown in FIG. 5, the video frame extraction module 111 receives an original multi-view video and extracts a plurality of frames from the input original multi-view video (S510).

Specifically, the video frame extraction module 111 may extract a preset number of frames (for example, 60 frames/cycle) from the input original multi-view video.

Next, the original video extraction unit 110 extracts the plurality of basic screen feature information from each extracted frame (S520).

Figure 6:
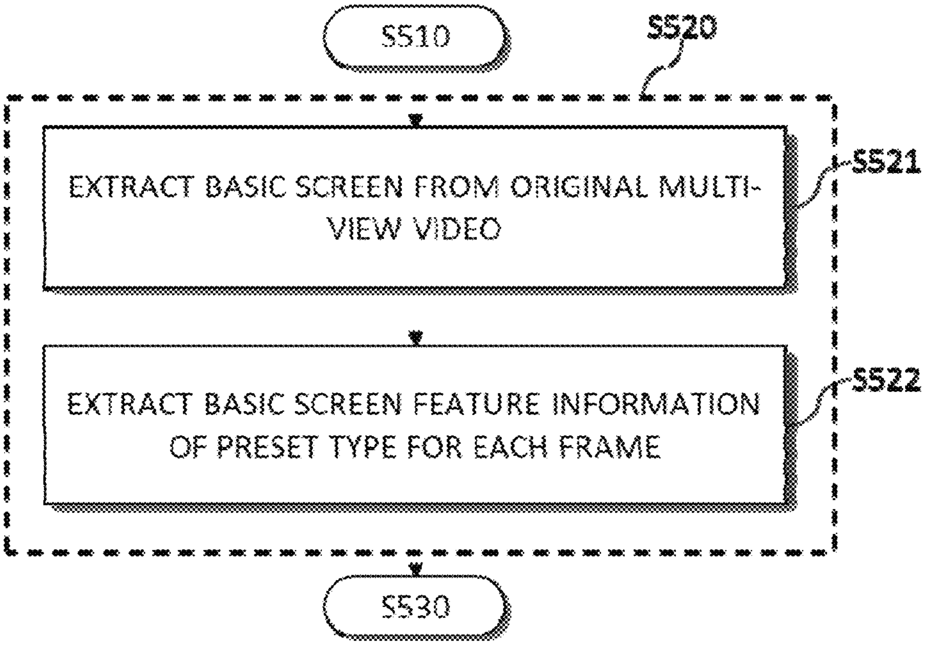
FIG. 6 is a flowchart showing an operation flow of a method for extracting basic screen feature information in step S520 of FIG. 5.

FIG. 6 is a flowchart showing an operation flow of a method for extracting basic screen feature information in step S520 of FIG. 5.

Referring to FIG. 6, in order to extract basic screen feature information, the basic screen feature information extraction module 112 first extracts the basic screen from the original multi-view video (S521).

Next, the basic screen feature information extraction module 112 extracts a plurality of basic screen feature information of a preset type for each frame from the extracted basic screen (S522).

At this time, the basic screen feature information extraction module 112 may extract the plurality of basic screen feature information of the preset type (for example, object type, object position, object outline, object shape, size, and motion).

Next, the original database generation module 113 stores the extracted plurality of basic screen feature information for each frame in the original database (S530).

Next, the video frame extraction module 121 receives the query multi-view video and extracts a plurality of frames from the input query multi-view video, and the depth information screen extraction module 122 extracts the plurality of depth information screens from the extracted depth information screens for each frame (S540).

Here, the depth information screen may have a smaller size and capacity than those of the basic information screen.

Figure 7:
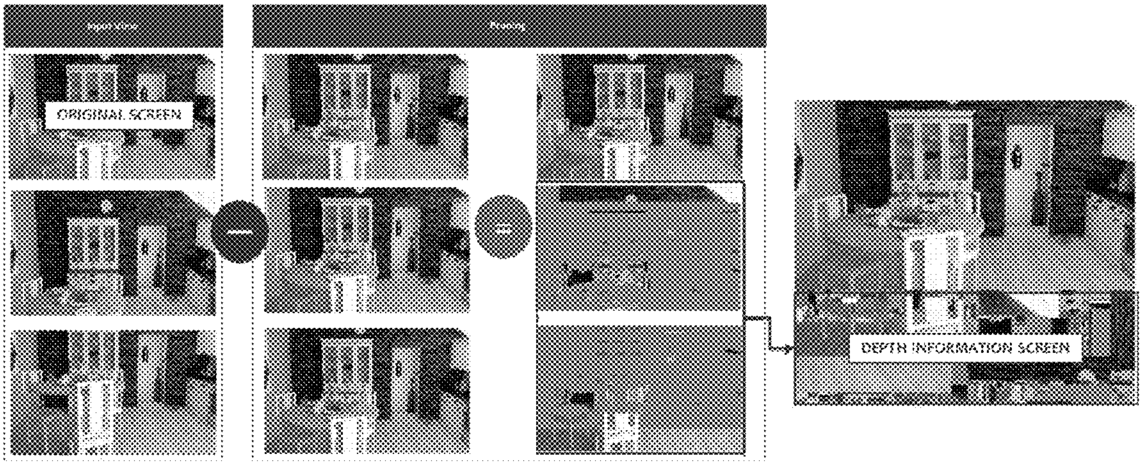
FIG. 7 is a reference view for explaining step S540 of FIG. 5.

FIG. 7 is a reference view for explaining step S540 of FIG. 5.

As shown in FIG. 7, the video frame extraction module 121 receives the query multi-view video and extracts the plurality of frames from the input query multi-view video, and the depth information screen extraction module 122 extracts the plurality of depth information screens in which depth information is stored from the input query multi-view video.

At this time, the depth information screen extraction module 122 may calculate each of differences between the basic screens in the plurality of query multi-view videos captured from a plurality of cameras (for example, 16 cameras configured in a 4×4 shape) at different positions, respectively, and extract the depth information screen in the form of combining the depth information screen generated by summing and compressing the calculated difference values with the basic screen.

Also, the depth information screen extraction module 122 may extract the depth information screen from the query multi-view video in which the depth information screen is combined with the basic screen.

Next, the query database generation module 123 extracts the plurality of depth information screen feature information from the extracted depth information screen for each frame (S550).

To elaborate, the query database generation module 123 may extract the plurality of depth information screen feature information of the preset type (for example, object type, object position, object outline, object shape, size, and motion) from the extracted depth information screen for each frame.

Next, the query database generation module 123 stores the extracted plurality of depth information screen feature information for each frame in the query database (S560).

Finally, the video determination unit 130 compares the basic screen feature information of the extracted original multi-view video with the depth information screen feature information of the query multi-view video to determine whether the query multi-view video is the same as the original multi-view video (S570).

Figure 8:
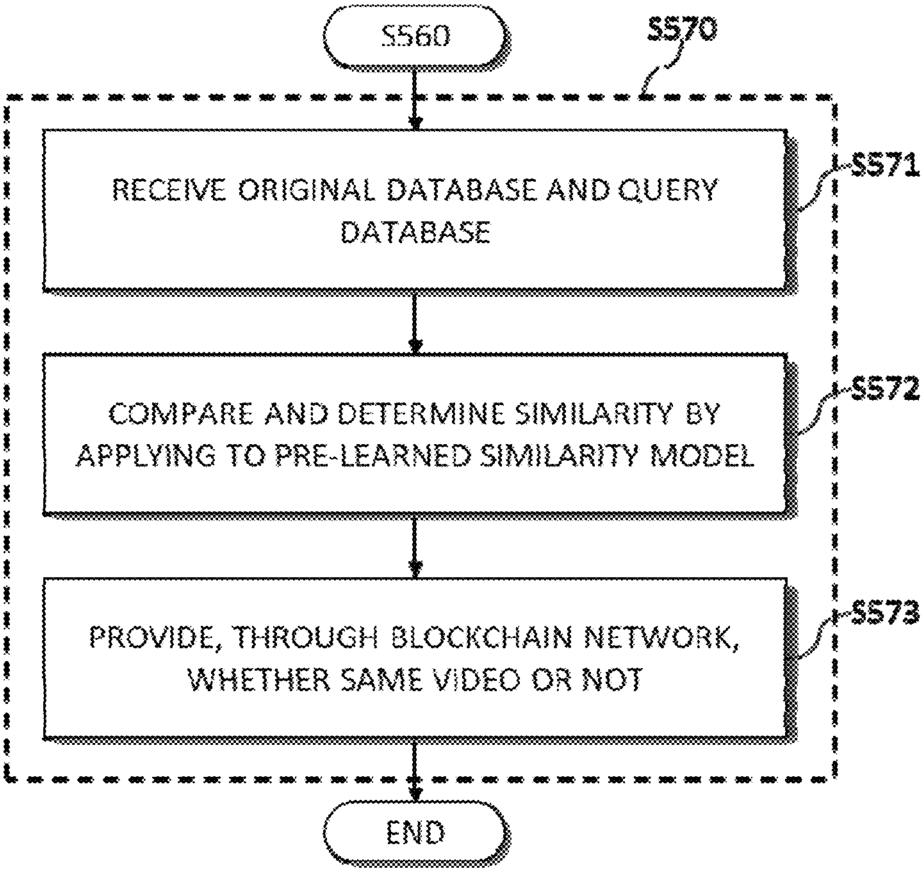
FIG. 8 is a flowchart showing an operation flow of a method for determining whether a query multi-view video is the same as an original multi-view video in step S570 of FIG. 5.

FIG. 8 is a flowchart showing an operation flow of a method for determining whether the query multi-view video is the same as the original multi-view video in step S570 of FIG. 5.

As shown in FIG. 8, the feature information input module 131 receives the original database stored in the original video extraction unit 110 and the query database stored in the query video extraction unit 120 (S571).

In other words, the feature information input module 131 may receive the plurality of basic screen feature information stored for each frame in the original multi-view video and the plurality of depth information screen feature information stored for each frame in the query multi-view video.

Then, the similarity determination module 132 compares and determines the similarity by applying the input original database and query database to the pre-learned similarity model (S572).

Specifically, the similarity determination module 132 may compare the similarity by applying the original database and the query database to the pre-learned similarity model, and when the similarity falls within a preset ratio range (for example, 85% to 100%), and determine that the query multi-view video is the same as the original multi-view video.

In addition, the providing module 133 provides, through a blockchain network, whether the query multi-view video is the same as the original multi-view video as a result of the similarity determination (S573).

At this time, the blockchain network includes a public blockchain network, a private blockchain network, and a hybrid blockchain network, and the determination result may be provided efficiently and securely.

As described above, according to the embodiments of the present invention, by using the basic screen feature information of the original multi-view video and the depth information screen feature information of the query multi-view video, it is possible to determine whether the videos are the same as each other, so that it is possible to perform the determination more quickly than before, and reduce a communication load in that the depth information screen feature information having a small data capacity may be used.

Although the present invention has been described with reference to the embodiments shown in the drawings, this is only exemplary, and those skilled in the art will understand that various modifications and equivalent other embodiments are possible therefrom. Therefore, the true technical scope of protection of the present invention should be determined by the technical spirit of the appended claims.

The invention claimed is:

1. An apparatus for determining a video based on depth information, the apparatus comprising:

- an original video extraction processor that receives an original multi-view video, extracts a plurality of frames from the input original multi-view video, extracts basic screen feature information from a basic screen for each extracted frame, and stores the extracted basic screen feature information in an original database for each frame;
- a query video extraction processor that receives a query multi-view video, extracts a plurality of frames and depth information screens from the input query multi-view video, extracts depth information screen feature information from the extracted depth information screen for each extracted frame, and stores the extracted depth information screen feature information in a query database for each frame; and
- a video determination processor connected to the original database and the query database to receive the basic screen feature information and the depth information screen feature information, the video determination processor comparing the basic screen feature information of the original multi-view video with the depth information screen feature information of the query multi-view video to determine whether the query multi-view video is the same as the original multi-view video, wherein the original video extraction processor includes:

- a first video frame extraction circuit configured to extract the plurality of frames from the original multi-view video;
- a basic screen feature information extraction circuit configured to:
  - extract from the original multi-view video, the basic screen which is a reference frame including feature information of the original multi-view video; and
  - extract the basic screen feature information which is a geometric profile of an object located in the extracted basic screen, wherein the geometric profile of the object includes an object type, an object position, an object outline, an object shape, and an object size; and
- an original database generation circuit configured to store the extracted the basic screen feature information for each frame in the original database, and wherein the query video extraction processor includes:

- a second video frame extraction circuit configured to extract the plurality of frames from the query multi-view video;

a depth information screen extraction circuit configured to:

calculate each of difference values between basic screens in the query multi-view video;

extract a preliminary depth information screen by summing up the calculated difference values and compressing a sum; and combine the extracted preliminary depth information screen with the basic screen of the query multi-view video to generate the depth information screen; and a query database generation circuit configured to:

extract the depth information screen feature information from the generated depth information screen for each frame; and store the depth information screen feature information for each frame in the query database.

2. The apparatus of claim 1, wherein the depth information screen has a smaller size and capacity than those of the basic screen.

3. The apparatus of claim 1, wherein the video determination processor includes:

a feature information input circuit that receives input of the generated original database and query database;

a similarity determination circuit that compares and determines a similarity by applying the input original database and query database to a pre-learned similarity model; and a providing circuit that provides, through a blockchain network, whether the query multi-view video is the same as the original multi-view video as a result of similarity determination.

4. A method for determining a video based on depth information, the method comprising:

receiving an original multi-view video and extracting a plurality of frames from the input original multi-view video;

extracting basic screen feature information from a basic screen for each of the extracted frames;

storing the extracted basic screen feature information in an original database for each frame;

receiving a query multi-view video and extracting a plurality of frames and depth information screens from the input query multi-view video;

extracting depth information screen feature information from the extracted depth information screen for each frame;

storing the extracted depth information screen feature information in a query database for each frame; and comparing the basic screen feature information of the original multi-view video with the depth information screen feature information of the query multi-view video to determine whether the query multi-view video is the same as the original multi-view video, wherein the extracting of the basic screen feature information includes;

extracting from the original multi-view video, the basic screen which is a reference frame including feature information of the original multi-view video; and extracting the basic screen feature information which is a geometric profile of an object located in the extracted basic screen, wherein the geometric profile of the object includes an object type, an object position, an object outline, an object shape, and an object size, and wherein the extracting of the plurality of frames and the depth information screens includes;

calculating each of difference values between basic screens in the query multi-view video;

extracting a preliminary depth information screen by summing up the calculated difference values and compressing a sum; and combining the extracted preliminary depth information screen with the basic screen of the query multi-view video to generate the depth information screen.

5. The method of claim 4, wherein the depth information screen has a smaller size and capacity than those of the basic screen.

6. The method claim 4, wherein the determining of whether the query multi-view video is the same as the original multi-view video includes:

receiving input of the generated original database and query database;

comparing and determining a similarity by applying the input original database and query database to a pre-learned similarity model; and providing, through a blockchain network, whether the query multi-view video is the same as the original multi-view video as a result of similarity determination.

7. The apparatus of claim 1, wherein the depth information screen includes the basic screen in the query multi-view video and the preliminary depth information screen separated from the basic screen.

8. The apparatus of claim 1, wherein the basic screen and the preliminary depth information screen in the depth information screen are arranged in a non-overlapping manner.

9. The method of claim 4, wherein the depth information screen includes the basic screen in the query multi-view video and the preliminary depth information screen separated from the basic screen.

10. The method of claim 4, wherein the basic screen and the preliminary depth information screen in the depth information screen are arranged in a non-overlapping manner.

* * * * *